US009122917B2

(12) United States Patent
Ivanchenko (10) Patent No.: US 9,122,917 B2
(45) Date of Patent: Sep. 1, 2015

(54) RECOGNIZING GESTURES CAPTURED BY VIDEO

(71) Applicant: Amazon Technologies, Inc., Reno, NV (US)

(72) Inventor: Volodymyr V. Ivanchenko, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/521,372

(22) Filed: Oct. 22, 2014

(65) Prior Publication Data

US 2015/0036884 A1 Feb. 5, 2015

Related U.S. Application Data

(63) Continuation of application No. 13/198,125, filed on Aug. 4, 2011, now Pat. No. 8,891,868.

(51) Int. Cl.
| | |
|---|---|
| *G06K 9/00* | (2006.01) |
| *G06F 3/01* | (2006.01) |
| *G06K 9/46* | (2006.01) |
| *G06T 7/20* | (2006.01) |

(52) U.S. Cl.
CPC ............ *G06K 9/00355* (2013.01); *G06F 3/017* (2013.01); *G06K 9/00* (2013.01); *G06K 9/4642* (2013.01); *G06T 7/2033* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,215,890 B1 | 4/2001 | Matsuo et al. | |
| 6,272,231 B1 | 8/2001 | Maurer | |
| 7,301,526 B2 | 11/2007 | Marvit | |
| 7,379,566 B2 | 5/2008 | Hildreth | |
| 2004/0140956 A1 | 7/2004 | Kushler | |
| 2005/0162381 A1 | 7/2005 | Bell | |

(Continued)

FOREIGN PATENT DOCUMENTS

| | | |
|---|---|---|
| CN | 1694045 A | 11/2005 |
| WO | 2006/036069 | 4/2006 |

OTHER PUBLICATIONS

Fujita et al., "A single-motion-vector/cycle-generation optical flow processor employing directional-edge histogram matching", ISCAS 2009.*

(Continued)

*Primary Examiner* — Anand Bhatnagar
*Assistant Examiner* — Soo Park
(74) *Attorney, Agent, or Firm* — Novak Druce Connolly Bove + Quigg LLP (57) ABSTRACT

Motions and gestures can be detected using a video capture element of a computing device even when the video capture element is not able to accurately capture the motion. Information about the background in the image information can be determined, and the way in which that background information is occluded can be used to determine the motion. In at least some embodiments, edges are detected in the video information. Images of foreground objects can then be isolated from edges of background images by comparing histograms of multiple frames of video. The remaining data is indicative of a direction and speed of motion, which can be used to infer a determined gesture even though that gesture was not visible in the captured video information.

20 Claims, 6 Drawing Sheets

(56) References Cited

U.S. PATENT DOCUMENTS

| | | | |
|---|---|---|---|
| 2005/0216867 A1 | 9/2005 | Marvit | |
| 2005/0275638 A1 | 12/2005 | Kolmykov-Zotov | |
| 2007/0164989 A1 | 7/2007 | Rochford | |
| 2008/0040692 A1 | 2/2008 | Sunday | |
| 2008/0266257 A1 | 10/2008 | Chiang | |
| 2009/0031240 A1 | 1/2009 | Hildreth | |
| 2009/0079813 A1 | 3/2009 | Hildreth | |
| 2009/0103780 A1 | 4/2009 | Nishihara et al. | |
| 2009/0153288 A1 | 6/2009 | Hope et al. | |
| 2009/0217210 A1 | 8/2009 | Zheng | |
| 2009/0265627 A1 | 10/2009 | Kim | |
| 2009/0271004 A1 | 10/2009 | Zecchin et al. | |
| 2009/0313584 A1 | 12/2009 | Kerr et al. | |
| 2010/0265316 A1 | 10/2010 | Sali et al. | |
| 2011/0102438 A1 | 5/2011 | Mathe et al. | |
| 2012/0027252 A1* | 2/2012 | Liu et al. | 382/103 |

OTHER PUBLICATIONS

Hayakawa et al., "Block-matching-based motion field generation utilizing directional edge displacement", Computers and Electrical Engineering 36 (2010) 617-625.*

Hao et al., "a VLSI-implementation-friendly ego-motion detection algorithm based on edge-histogram matching", ICASSP 2006.*

U.S. Non-Final Office Action for U.S. Appl. No. 13/198,008 dated Feb. 3, 2014.

U.S. Non-Final Office Action for U.S. Appl. No. 12/332,049 dated Jun. 7, 2011.

U.S. Final Office Action for U.S. Appl. No. 12/332,049 dated Oct. 27, 2011.

U.S. Non-Final Office Action for U.S. Appl. No. 12/332,049 dated Nov. 7, 2012.

U.S. Final Office Action for U.S. Appl. No. 12/332,049 dated Jun. 6, 2013.

U.S. Notice of Allowance for U.S. Appl. No. 12/332,049 dated Mar. 4, 2014.

U.S. Non-Final Office Action for U.S. Appl. No. 13/198,125 dated Jul. 26, 2013.

U.S. Final Office Action for U.S. Appl. No. 13/198,125 dated Dec. 18, 2013.

U.S. Non-Final Office Action for U.S. Appl. No. 13/198,125 dated Mar. 26, 2014.

Notice of Allowance for U.S. Appl. No. 13/198,125 dated Jul. 18, 2014.

Haro, et al., Mobile Camera-Based Adaptive Viewing, dated Dec. 8, 2005.

Nokia N95 8GB Data Sheet, dated Aug. 21, 2007.

"CA Examiner's Report mailed Jan. 9, 2015, by the Canadian Intellectual Property Office, for Canadian Patent Application No. 2,743,914" (3 pages).

"CN Decision of Rejection mailed Dec. 3, 2014, by the Chinese Intellectual Property Office, for Chinese Patent Application No. 200980146841.0" (19 pages).

* cited by examiner

RECOGNIZING GESTURES CAPTURED BY VIDEO

CROSS REFERENCE TO RELATED APPLICATION

This application is a continuation of U.S. patent application Ser. No. 13/198,125, entitled "RECOGNIZING GESTURES CAPTURED BY VIDEO," filed Aug. 4, 2011, which is incorporated herein by reference for all purposes.

BACKGROUND

People are increasingly interacting with computers and other electronic devices in new and interesting ways. One such interaction approach involves making a detectable motion with respect to a device. While complex motion analysis devices are able to determine the motion with relative accuracy, such analysis is difficult to implement on consumer devices, particularly mobile or portable computing devices that generally have relatively simple camera elements. These camera elements often suffer from various limitations, such as a rolling shutter effect, that make it difficult to determine motion from still or video image information, as the motion appears as a blur in the captured image information. Even for higher quality video capture elements, motion blur can occur in certain environments or situations, such as indoors under low lighting conditions or when the user's hand is positioned too close to the camera. The limitations thus make it difficult, if not impossible, to determine the precise motion that was captured using one of these conventional devices.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, various embodiments enable a user to provide gesture-based input to an electronic device without need to physically contact the device. The performance of the gesture can be captured by at least one imaging element of the computing device, for example, and analyzed by the computing device (or a system, device, or service in communication with the computing device) to attempt to identify the gesture. The captured image information can include at least a portion of the user, and can be analyzed to attempt to determine motion information corresponding to a gesture being performed by that user. The motion information can be compared to information stored for a set of gestures for use in identifying that gesture.

In various embodiments, the captured image information can include video information captured over a period of time by at least one video capture element of a computing device. The video information can be analyzed at various points in time, such as at specific frames or locations in the video, to detect edges of various objects in the video information. The edges then can be analyzed, such as by generating a histogram or other such measurement of edge locations in a set of video frames. Changes in the histograms then can be analyzed to determine whether those changes represent consistent background motions, as may be due to movement of the device, or motions consistent with a gesture. As discussed, a physical gesture might not be able to be detected in the video information as the motion may appear as a blurred area of the image, but the blurred area will obfuscate any edges in that portion of the image, causing a corresponding change in the edge histogram. By determining the changes in the edge measurements and inferring a type of corresponding motion, gestures can be detected even though the imaging element might not be able to detect the actual gesture.

Various other applications, processes and uses are presented below with respect to the various embodiments.

Figure 1:
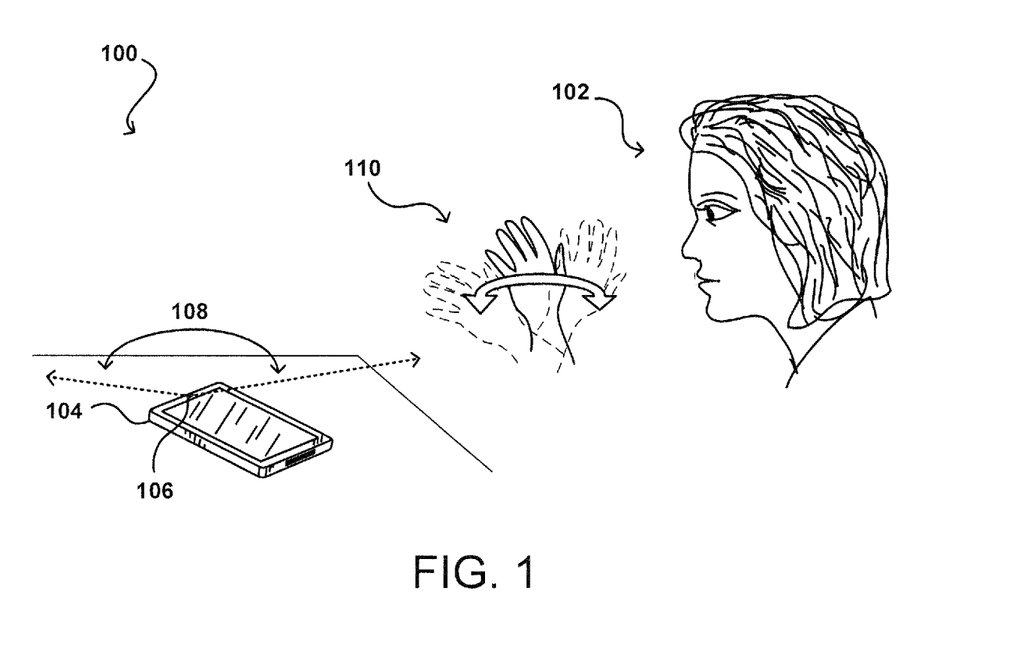
FIG. 1 illustrates an example environment in which various aspects can be implemented in accordance with various embodiments.

FIG. 1 illustrates an example situation 100 wherein a user 102 would like to provide gesture- and/or motion-based input to a computing device 104, such as to wake up the device, flip to the next page in an electronic book ("e-book"), or perform another such action. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one video capture element 106 operable to perform video capture over an associated capture range 108. Each image capture element may be, for example, a charge-coupled device (CCD) or complimentary metal-oxide semiconductor (CMOS) sensor, for example, or can utilize another appropriate image capturing technology.

In this example, the user 102 is performing a selected motion or gesture using the user's hand 110. The motion can be one of a set of motions or gestures recognized by the device to correspond to a particular input or action, or can be a specific motion or gesture associated with that particular user. If the motion is performed within the angular capture range 108 of at least one of the imaging elements 106 on the device, the device can capture video information including at least a portion of the motion or gesture, analyze the image information using at least one video analysis algorithm, and determine movement of at least one feature of the user between subsequent frames or portions of the image information.

Figure 2A:
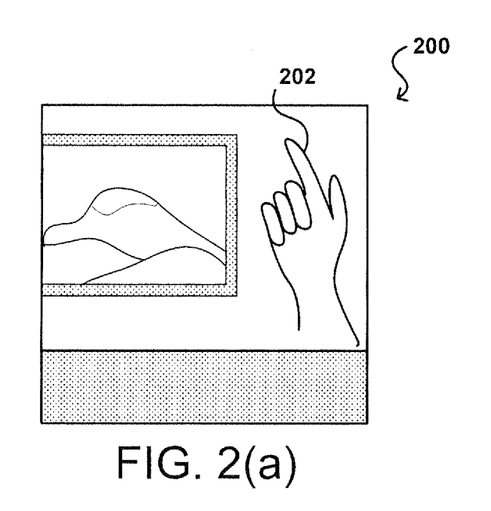
FIGS. 2(a) and 2(b) illustrate an example motion that can be intended as input in accordance with various embodiments.
Figure 2B:
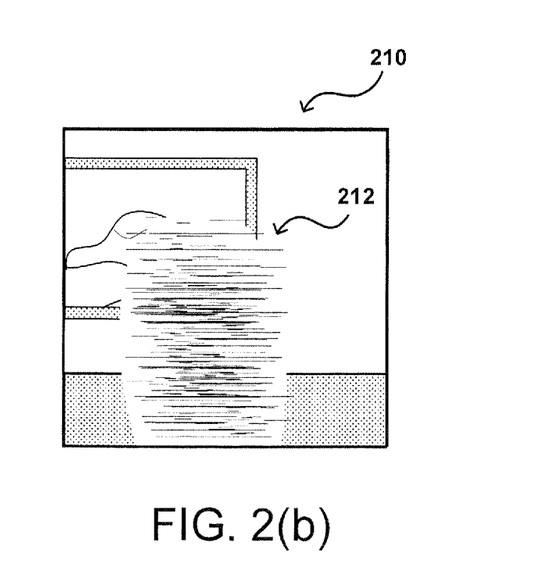

As discussed, however, various video cameras are not able to accurately capture gesture information due to the nature of the camera sensor, amount of light in the area, or other such aspects. For example, consider the example 200 of FIG. 2(a). In this example, the user's hand 202 is relatively motionless with respect to the video camera capturing the image, such that there are well defined edges of the hand as well as other objects in the background. If the video camera has a relatively slow capture rate, a long exposure time, a rolling shutter effect, or any other such deficiency, however, the camera might not be able to adequately capture information for various types of motion. For example, in the situation 210 of FIG. 2(b) the user's hand moves from right to left in the captured video information. As can be seen, the motion appears as blurred region 212 in the image. Aspects such as the distance to, and speed of, the motion can affect the amount of blur, such that a gesture made with a user's arm at a typical distance from a device might not be discernable from the video information. Thus, it can be difficult to determine the presence of a gesture or other such motion in the video information. A user can get around this problem by performing substantially slow, controlled gestures in at least some situations, but such requirements can degrade the user experience.

Systems and methods in accordance with various embodiments, however, can take advantage of the fact that the motion also blurs out the background objects in the image near the location of the gesture. For example, in FIG. 2(b) it can be seen that the edges of objects behind the blurred area corresponding to the motion do not appear in the video frame. By monitoring changes in the edge information, motions and gestures can be determined that are otherwise difficult to determine using conventional image analysis approaches.

Figure 3A:
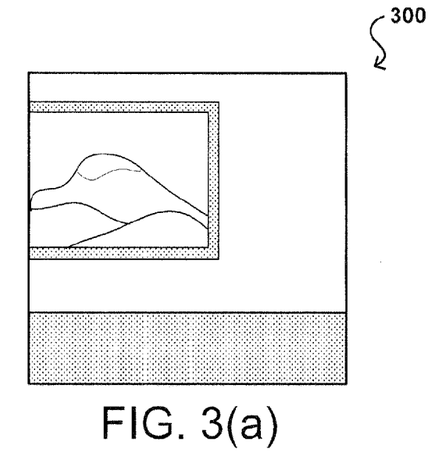
FIGS. 3(a), (b), (c), (d), (e), and (f) illustrate an example process for determining gesture input from captured video information that can be used in accordance with various embodiments.
Figure 3B:
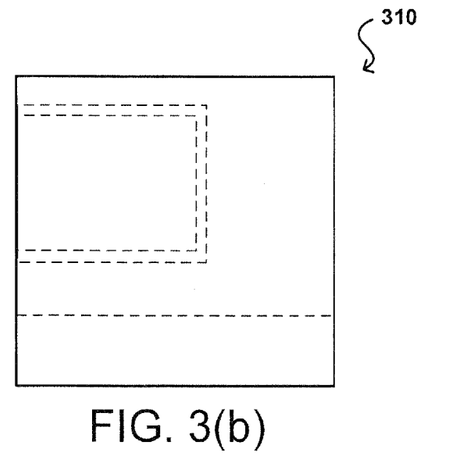
Figure 3C:
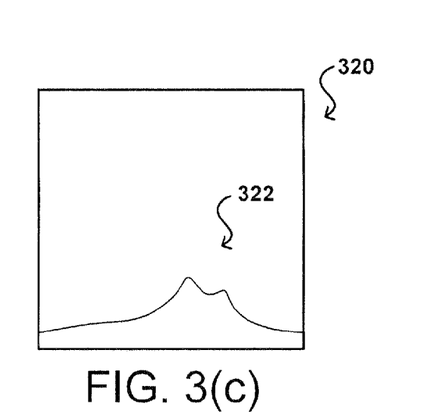

In one example, FIG. 3(a) illustrates a frame of video 300 that could be captured by a video capture element of a computing device in accordance with various embodiments. In this example, there is relatively little motion, such that the edges are clearly visible in the video frame. It at least some embodiments, one or more edge detection algorithms can be executed against the video frame in order to location positions of one or more prominent edges in the video frame, as illustrated in the processed image 310 of FIG. 3(b). In some embodiments the algorithm can look at horizontal and/or vertical edges, while in other embodiments one or more algorithms can be used to recognize any appropriate edges in a given video frame. Once the edges are detected, the locations of those edges can be analyzed, such as by analyzing location information along a given axis to generate a one-dimensional histogram 322 as shown in the example plot 320 of FIG. 3(c). In this example, there can be peaks in the image that correspond to vertical edges of the picture frame in FIG. 3(a) and any other such object. If there is no motion in the capture area, this histogram will remain substantially unchanged over time.

Figure 3D:
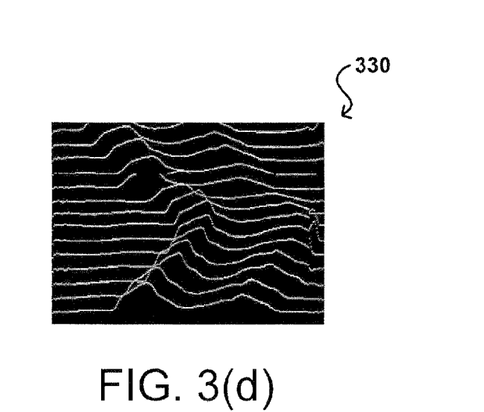

In certain situations, the video might be captured by a video camera of a portable computing device, such as a tablet computer or smart phone. If the user is holding the device in the user's hand, for example, there might be slight movements due at least in part to the user being unable to hold the camera totally still, moving the device to capture video of other areas, etc. In such a situation, however, the entire background will move together, such that the detected change in edge position can be attributed to device motion. For example, FIG. 3(d) illustrates an example plot for several frames of analyzed video over a period of time, where the shape of each histogram is relatively similar other than a slight offset due to device motion. Such information can be interpreted as not being indicative of a gesture. In at least some embodiments, histograms for at least two consecutive frames of video can be compared to determine an amount of image variation due to, for example, device movement between those frames. For example, in FIG. 3(d) strong edges (represented by, for example, high values in the histograms that are most likely to correspond to background objects) can be used to correlate the relative positions of features in the histograms such that an amount of deviation due to device movement can be determined. Based on the amount of deviation, a shift of one or more histograms can be performed to effectively remove any movement of strong edges between adjacent frames.

Figure 3E:
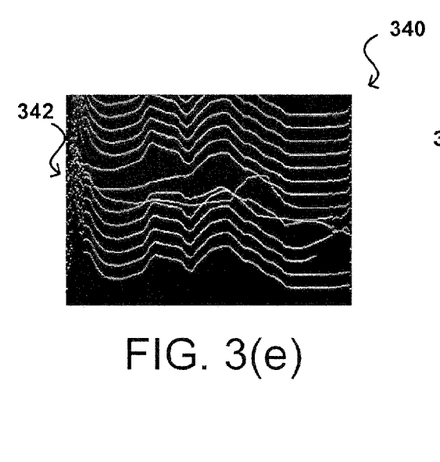
Figure 3F:
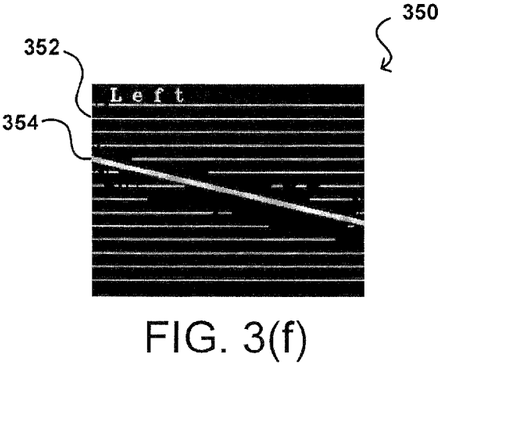

FIG. 3(e) illustrates an example plot 340 of histograms for several frames of video. In this example, the histograms have been correlated to determine a relative amount of shift between adjacent histograms. As illustrated, strong edges represented by peaks in the histograms can be well correlated. Once the histograms are shifted to remove device movement, the histograms can be overlaid and compared or correlated to determine any significant differences in the histograms. In FIG. 3(e), a few adjacent histograms 342 are substantially different in shape. Such distinct differences or uncorrelated regions can be used to determine that there was some type of abrupt motion captured during those frames. In order to determine a type of motion, one or more processing algorithms can be used to isolate any motion in the foreground from the background. For example, edges corresponding to background objects can be determined by analyzing the shape of the histograms to determine a correlation pattern. Such a shape can then be subtracted or otherwise compared against one or more uncorrelated histograms 342 representing a period of unexplained motion. The amount and/or type of miscorrelation can be indicative of a type of motion. For example, FIG. 3(f) illustrates a plot 350 of two or more histograms of FIG. 3(e) alter correlating the histograms, showing an amount of miscorrelation, such as motion from the foreground edge information 354 as isolated from the background edge information 352. As can be seen, there was a significant miscorrelation representing a motion to the left during the time of capture of those frames of video. Based on information such as a slope of the curve, as may represent speed of the motion, and an intensity of the edge determination, as may represent distance, and other such information, it can be determined whether this motion likely was the result of a gesture being made within a typical range of the device, or another type of motion, such as a person or car passing by, etc. Such detection is useful for various types of gesture, such as a user waving an arm back and forth to wake up a device, moving a hand up and down to provide navigational input, and the like. Various types of motion input are described, for example, in co-pending U.S. patent application Ser. No. 12/332,049, filed Dec. 10, 2008, and entitled "Movement Recognition as Input Mechanism," which is hereby incorporated herein by reference.

In one example algorithm, processing of the video information involves generating histograms of edges in a series of video frames and plotting those histograms as a history across about twenty frames, although the number can depend upon any of a number of factors, such as the frame rate of the video. Looking at this history, changes in the histograms can be monitored across time. One or more processing algorithms can be used to determine types of movement between histograms. In at least some embodiments, relatively smooth changes are interpreted as background movement while more abrupt changes are interpreted as potential gestures or input motions. Abrupt changes between histograms for neighboring frames can be labeled as "unexplained movements," for example, which then can be analyzed using one or more histogram change algorithms. In at least some embodiments, the unexplained data will be represented by a slanted line when the motion is a gesture, representing movement from one area to another. If the histograms are analyzed in multiple directions, a gesture movement should be represented as a slant in at least one direction. If the data presents a slant, information about the slant can be used to determine whether the motion likely corresponded to a gesture. For example, the direction of the slant will correspond to a direction of the motion, and the slope of the slant can correspond to a speed of the motion.

Such an algorithm can rely upon information such as background occlusions, and thus can tolerate blurring of objects in the foreground. In some cases, however, the background might not have significant edges that can be occluded. For example, a user might be sitting in an office with a blank white wall behind the user. In such cases, an application executing on the computing device can determine through histogram analysis that there is little background information available, and might switch to a different mode or type of analysis in at least some embodiments. For example, the algorithm might just look for abrupt motions and attempt to determine a slant for those motions without worrying about the need to subtract out the background features. In some embodiments, motion or orientation determining elements (e.g., accelerometers, electronic gyroscopes, or inertial sensors) of the computing device can be used to determine motion of the device and attempt to remove that information from the video frame histograms, which can be helpful in determining object motion when there is no background information to use to determine device motion. In cases of significant device movement, such as where a user flicks open a cell phone, the gesture detection might be temporarily disabled and/or the video information discarded for that portion of time. Various other approaches can be used as well within the scope of the various embodiments.

In some instances, a motion in a background or of another object might be of a relative size and speed that can potentially be registered as a false positive. In at least some embodiments, additional elements such as stereo cameras or infrared emitters can be used to separate out the background in order to enable more accurate determination of foreground features. Examples of such elements can be found, for example, in co-pending U.S. patent application Ser. No. 13/198,008, filed Aug. 4, 2011, and entitled "OVERCOMING MOTION EFFECTS IN GESTURE RECOGNITION," which is hereby incorporated herein by reference.

In some embodiments, the captured video information can be pre-preprocessed to assist with gesture recognition. For example, the video information can be converted to a grayscale image to reduce the amount of processing capacity needed, as well as to more easily distinguish edges in the image. In some embodiments, an amount of blur can be applied to reduce the likelihood of false edge detection, or reduce the detection of minor edges in the video information. As discussed gradients in one or more directions then can be determined based on the type(s) and/or variety of possible gestures that can be used to provide input to the device. In some embodiments, the resulting histograms also can be blurred to improve correlation calculations. Various thresholding techniques also can be used to separate out the foreground and background objects, as foreground objects will occlude portions of the background resulting in low histogram values for the detected edges.

Further, different types of motion can present different shapes in the analyzed histogram data. As mentioned, swiping motions in one direction or another can produce stripes or lines having a particular slope. Other motions can have other shapes, such as push/pull motions resulting in an elliptical shape in the processed histogram data. The magnitude and shape of the result can be indicative of the speed and direction of the gesture, as discussed above. The ability to rely on changes in the relatively slow moving or stationary features can enable the determination of relatively fast motions that cannot be analyzed independently due to motion blur and other such occurrences. Further, such an approach does not rely on image recognition to determine a shape or feature of a user, for example, and thus can require much less processing capacity that other potential approaches.

Figure 4A:
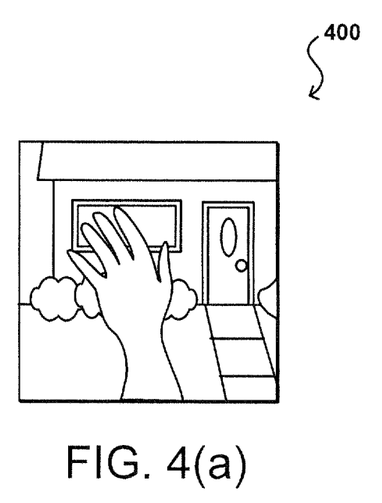
FIGS. 4(a), (b), and (c) illustrate example images for analysis with different types of illumination in accordance with various embodiments.

As mentioned, various types of information can be used to attempt to locate and track specific features over time. One approach utilizes ambient-light imaging with a digital camera (still or video) to capture images that can be analyzed with an image recognition algorithm. As is known in the art, and as illustrated in the example image 400 of FIG. 4(a), however, ambient light images can include information for a number of different objects and thus can be very processor and time intensive to analyze. For example, an image analysis algorithm would not only have to differentiate the hand from the door and sidewalk in the image, but would also have to identify the hand as a hand, regardless of the hand's orientation. Such an approach can require shape or contour matching, for example, which can still be relatively processor intensive. A less processor intensive approach would be to separate the hand from the background before analysis.

Figure 4B:
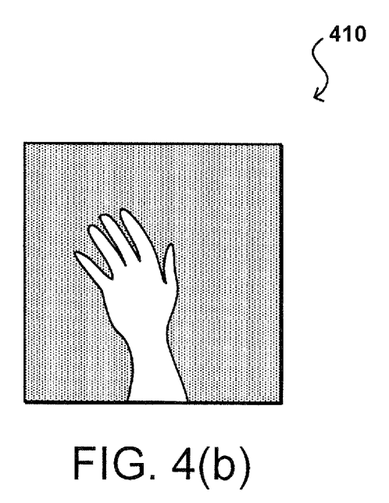

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). For example, FIG. 4(b) illustrates an example image 410 wherein an LED or other source of illumination is activated (e.g., flashed or strobed) during a time of image capture of at least one gesture sensor. As can be seen, since the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

Figure 4C:
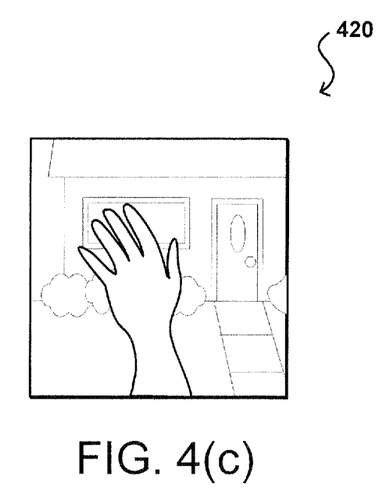

In embodiments where there is not a sufficiently fast shutter, where there is a rolling shutter effect, or in other such situations, it might be difficult to substantially prevent detecting reflections from other objects near the device. For example, FIG. 4(c) illustrates an example image 420 that could be captured using an infrared (IR) sensor, for example, wherein the hand is easier to locate in the image but the background is still present enough that an image processing algorithm might have to process other objects in the image, or might not be able to quickly locate a specific feature with a minimum level of certainty. In at least some embodiments, a device can capture both an ambient light image, such as in FIG. 4(a), and a reflected IR image, such as in FIG. 4(b). By having both images, one or more algorithms can be used to shift the images (to account for distance offset of the imaging elements) and then subtract the ambient light image 400 from the reflected IR image 420. The resulting image would be substantially dominated by the hand of the user. In at least some embodiments, a weighted subtraction can be performed when it is determined (due to contrast, lighting, or other such aspects) that the background information is likely much more intense in the ambient light image than the IR image, and vice versa. In some cases, a set of weighted comparisons can be performed until one or more features can be located with a minimum level of confidence.

Figure 5:
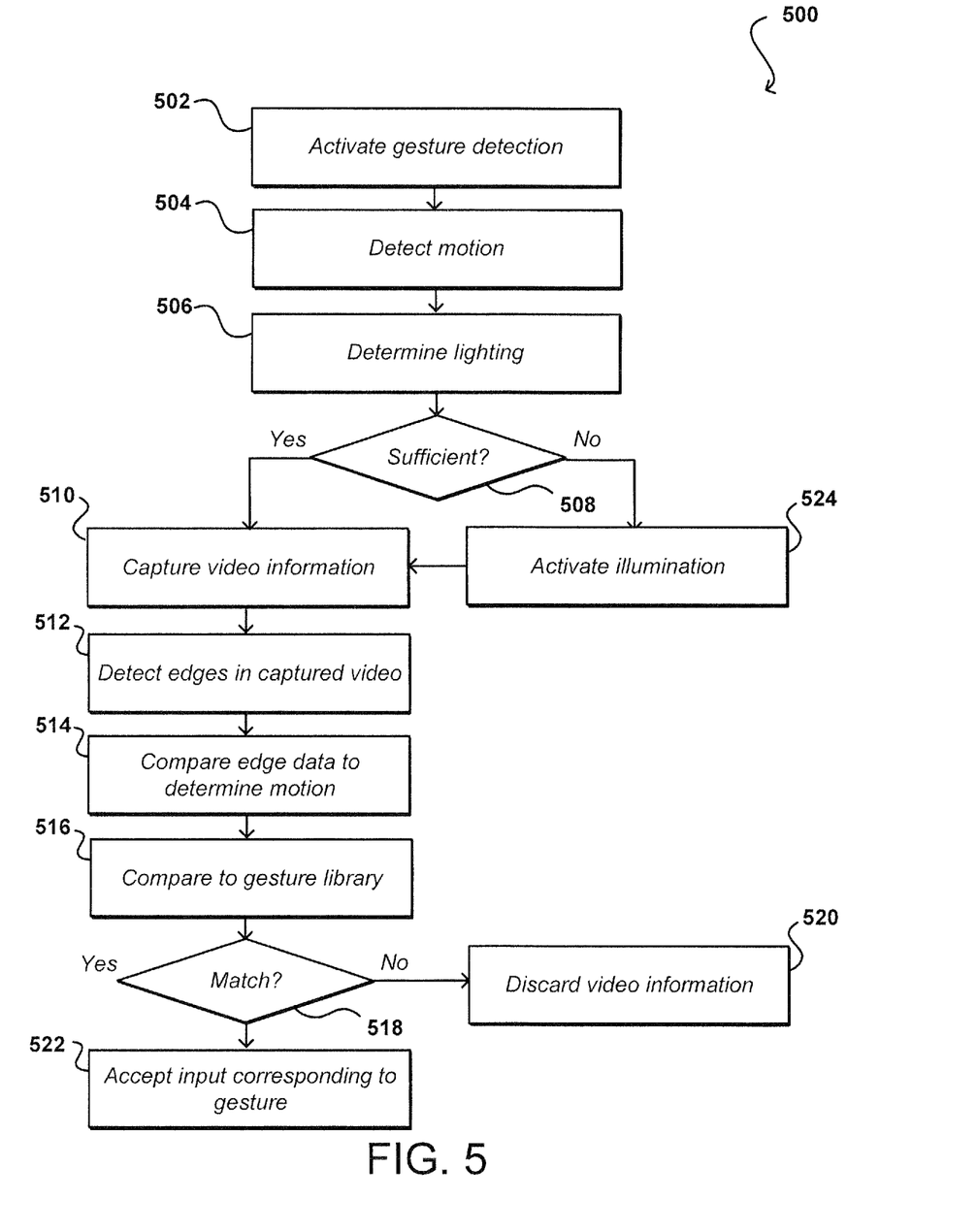
FIG. 5 illustrates an example process for determining user input that can be performed in accordance with various embodiments.

FIG. 5 illustrates an example process 500 for enabling gesture input for a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, gesture detection is activated on a computing device 502. In at least some embodiments this is activated manually by the user or upon activation of an application, for example, but can also be continually active in at least a low power state in other embodiments.

In this example, a computing device might run in a low power or low resolution mode, such as where there has not been recent gesture input. Such a mode can comprise, for example, capturing image or video information at a lower capture rate or analyzing captured information less frequently. In at least some embodiments, the device will change into a different mode or otherwise activate certain functionality once motion is detected 504, whether through image analysis, use of a motion detector, etc. In this example, a light detector or other such mechanism (hardware and/or software analyzing the captured image information) can determine whether there is sufficient lighting 506. If it is determined that the light is not sufficient 508, or if light is otherwise needed (such as for IR illumination), one or more illumination sources can be activated 524 before video information is captured 510. As mentioned elsewhere herein, the illumination source can be any appropriate source operable to provide an adequate amount and/or type of illumination (e.g., white light or IR), at any appropriate time (e.g., continuously during image capture or strobed with a timing of the capture).

The captured video information, which can include cached or other such temporarily stored video information as discussed elsewhere herein, can be analyzed to attempt to detect edges in a set of video frames 512. As discussed, this can include detecting edges in a set of video frames and generating one or more histograms or other representations of those edges in each video frame. The representations of the edge data then can be analyzed to determine motion 514, such as by subtracting out background or device movement and analyzing the resulting edge data.

If the analyzed information is indicative of a potential gesture, information such as the relative direction of the motion can be compared against one or more gesture patterns in a gesture library 516 or other such source. Any appropriate matching algorithm can be used as discussed or suggested herein. If no match can be found with at least a minimum confidence, level of certainty, or other such criterion or threshold 518, the video information (and associated histogram data) can be discarded 520. If a match can be determined with an appropriate confidence, etc., input corresponding to that gesture can be accepted 522. Various other approaches can be used as well as discussed or suggested elsewhere herein.

Figure 6:
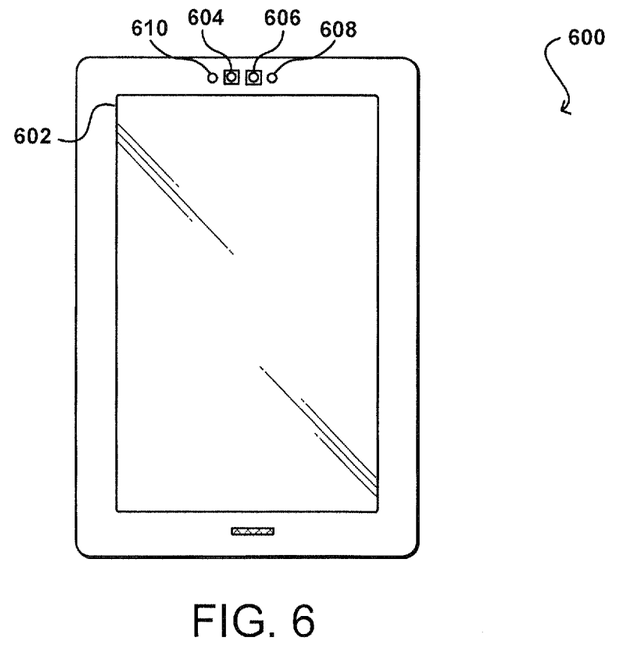
FIG. 6 illustrates an example computing device that can be used in accordance with various embodiments.

FIG. 6 illustrates an example computing device 600 that can be used to perform such a method in accordance with various embodiments. In this example, the device has a conventional digital camera 604 on a same side of the device as a display element 602, enabling the device to capture image information about a user of the device during typical operation where the user is at least partially in front of the display element. In addition, there is an infrared (IR) sensor 606 (or transceiver, etc.) positioned on the same side of the device that can be used to determine gesture input from the user when at relatively the same location. Such a configuration is useful when ambient light image information is subtracted from IR image information, but it should be understood that there can be additional or fewer cameras, sensors, or other such elements on the same or other sides or locations of the device as well within the scope of the various embodiments, such as may enable gesture or image input from any desired direction or location with respect to the device.

In this example, a light sensor 608 is included that can be used to determine an amount of light in a general direction of an image to be captured and at least one illumination element 610, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 7:
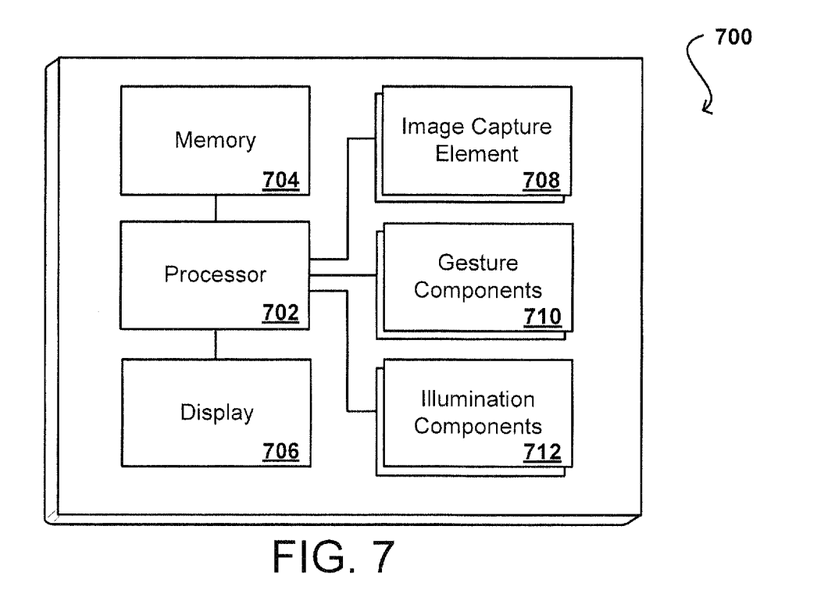
FIG. 7 illustrates an example configuration of components of a computing device such as that illustrated in FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one separate gesture component 710, such as an IR sensor or detector, operable to capture information for use in determining gestures or motions of the user, which will enable the user to provide input through the portable device without having to actually contact and/or move the portable device. The device also can include at least one illumination element 712, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
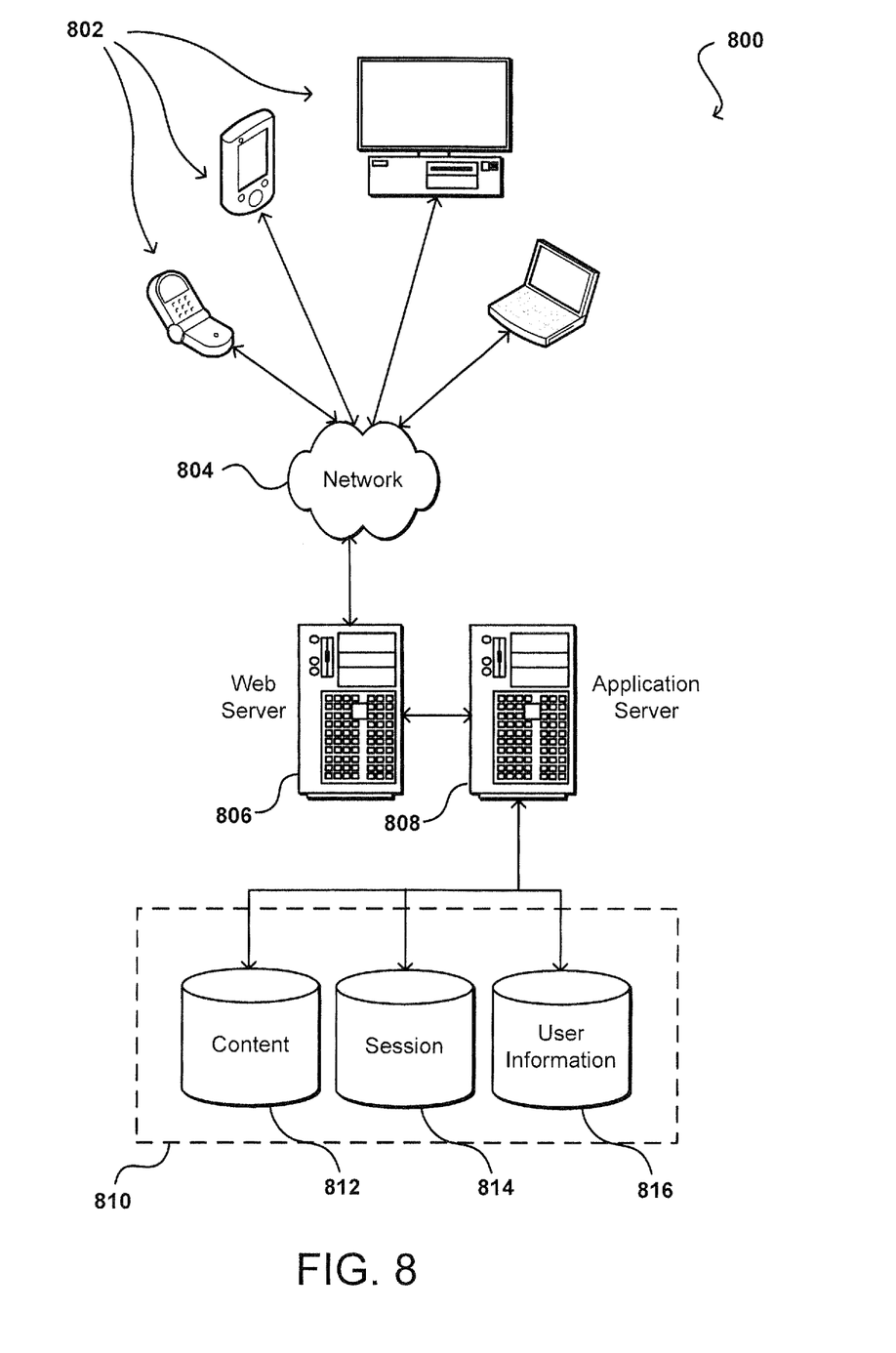
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing input to a computing device, comprising:
   under control of one or more computer systems configured with executable instructions, determining a lighting condition using a light sensor of the computing device;
   capturing, while an illumination element is not active and using at least one image capture element of the computing device, a first image frame of a plurality of image frames;
   automatically activating the illumination element of the computing device based at least in part upon the lighting condition;
   capturing, while the illumination element is active and using the at least one image capture element of the computing device, a second image frame of the plurality of image frames, the illumination element causing a foreground portion of the first image frame to be distinguishable from a background portion of the first image frame;
   generating first histogram data relating to edge information for the first image frame of the plurality of image frames;
   generating second histogram data relating to edge information for the second image frame of the plurality of image frames, wherein the second image frame is adjacent in time to the first image frame;
   removing data relating to the first histogram data from the second histogram data;
   determining an amount of miscorrelation between the first histogram data and the second histogram data, the amount of miscorrelation being indicative of a type of motion;

determining a shape representing the amount of miscorrelation, the shape including characteristics indicative of a speed and a direction of the motion;

determining the shape corresponds to stored gesture information for at least one gesture; and identifying an input, for the computing device, associated with the stored gesture information.

2. The computer-implemented method of claim 1, further comprising:

activating a gesture input mode on the computing device, the image information being captured while the gesture input mode is active.

3. The computer-implemented method of claim 2, wherein the gesture input mode is activated in response to detecting motion near the computing device.

4. The computer-implemented method of claim 1, further comprising:

differentiating a motion of a gesture made near the computing device from a motion of a gesture made at a greater distance from the computing device.

5. The computer-implemented method of claim 4, wherein differentiating the motion of the gesture is based on at least one of: the shape representing the amount of miscorrelation, a speed of the motion, or an edge determination.

6. The computer-implemented method of claim 1, wherein determining the shape corresponds to stored gesture information further comprises:

determining a gradual change of the shape to be background movement; and determining an abrupt change of the shape to be a potential gesture or input motion.

7. The computer-implemented method of claim 1, wherein activating the illumination based on the lighting condition further comprises:

determining an ambient lighting condition; and based at least in part on the determined ambient lighting condition, illuminating an object related to the image information.

8. The computer-implemented method of claim 1, wherein the illumination causes a background of the object to be obscured.

9. The computer-implemented method of claim 1, wherein the illumination is provided by at least one of: a white light, a light emitting diode, an infrared device, a continuous illumination, a flash illumination, a pulse illumination, or a strobe illumination.

10. A computing device, comprising:
a processor;
at least one image capture element;
a light sensor;
an illumination element; and
a memory device including instructions operable to be executed by the processor to perform a set of actions enabling the computing device to:
determine a lighting condition using the light sensor of the computing device; capture, while the illumination element is not active and using the at least one image capture element of the computing device, a first image frame of a plurality of image frames;
automatically activate the illumination element of the computing device based at least in part upon the determined lighting condition;
capture, while the illumination element is active and using the at least one image capture element of the computing device, a second image frame of the plurality of image frames, the illumination element causing a foreground portion of the first image frame to be distinguishable from a background portion of the first image frame;
generate first histogram data relating to edge information for the first image frame of the plurality of image frames;
generate second histogram data relating to edge information for the second image frame of the plurality of image frames, wherein the second image frame is adjacent in time to the first image frame;
remove data relating to the first histogram data from the second histogram data;
determine an amount of miscorrelation between the first histogram data and the second histogram data, the amount of miscorrelation being indicative of a type of motion;
determine a shape representing the amount of miscorrelation, the shape including characteristics indicative of a speed and a direction of the motion;
determine the shape corresponds to stored gesture information for at least one gesture; and
identify an input, for the computing device, associated with the stored gesture information.

11. The computing device of claim 10, the instructions further enabling the computing device to:
in response to detecting motion near the computing device, activate a gesture input mode on the computing device, the image information being captured while the gesture input mode is active.

12. The computing device of claim 10, the instructions further enabling the computing device to:
based on at least one of: the shape representing the amount of miscorrelation, a speed of the motion, or an edge determination,
differentiate a motion of a gesture made near the computing device from a motion of a gesture made at a greater distance from the computing device.

13. The computing device of claim 10, wherein the determined shape representing the amount of miscorrelation is a line.

14. The computing device of claim 10, wherein determining the shape corresponds to stored gesture information further comprises:
determining a gradual change of the shape to be background movement; and
determining an abrupt change of the shape to be a potential gesture or input motion.

15. The computing device of claim 10, wherein activating the illumination based on the lighting condition further comprises:
determining an ambient lighting condition; and
based at least in part on the determined ambient lighting condition, illuminating an object related to the image information.

16. A system, comprising:
at least one processor;
at least one image capture element;
a light sensor;
an illumination element; and
a memory device including instructions operable to be executed by the at least one processor to perform a set of actions enabling the system to:
determine a lighting condition using the light sensor;
capture, while the illumination element is not active and using the at least one image capture element, a first image frame of a plurality of image frames;

automatically activate the illumination element based at least in part upon the determined lighting condition;

capture, while the illumination element is active and using the at least one image capture element, a second image frame of the plurality of image frames, the illumination element causing a foreground portion of the first image frame to be distinguishable from a background portion of the first image frame;

generate first histogram data relating to edge information for the first image frame of the plurality of image frames;

generate second histogram data relating to edge information for the second image frame of the plurality of image frames, wherein the second image frame is adjacent in time to the first image frame;

remove data relating to the first histogram data from the second histogram data;

determine an amount of miscorrelation between the first histogram data and the second histogram data, the amount of miscorrelation being indicative of a type of motion;

determine a shape representing the amount of miscorrelation, the shape including characteristics indicative of a speed and a direction of the motion;

determine the shape corresponds to stored gesture information for at least one gesture; and identify an input associated with the stored gesture information.

17. The system of claim 16, the instructions further enabling the system to:
   in response to detecting motion near the video capture element, activate a gesture input mode, the image information being captured while the gesture input mode is active.

18. The system of claim 16, the instructions further enabling the system to:
   based on at least one of: the shape representing the amount of miscorrelation, a speed of the motion, or an edge determination,
      differentiate a motion of a gesture made near the video capture element from a motion of a gesture made at a greater distance from the video capture element.

19. The system of claim 16, wherein the determined shape representing the amount of miscorrelation is a line.

20. The system of claim 16, wherein determining the shape corresponds to stored gesture information further comprises:
   determining a gradual change of the shape to be background movement; and
   determining an abrupt change of the shape to be a potential gesture or input motion.

* * * * *